Dec. 8, 1931.    S. HAMMER    1,835,042
MIRROR ATTACHING MEANS
Filed April 26, 1930    2 Sheets-Sheet 1

INVENTOR
Samuel Hammer
BY C. P. Goljel
his ATTORNEY

Dec. 8, 1931.   S. HAMMER   1,835,042
MIRROR ATTACHING MEANS
Filed April 26, 1930      2 Sheets-Sheet 2
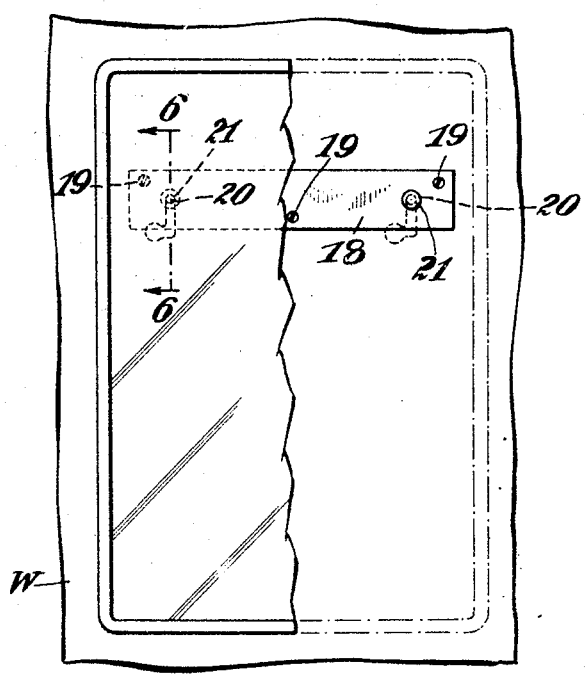
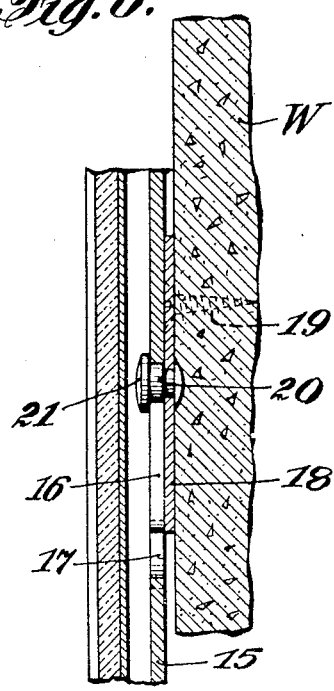
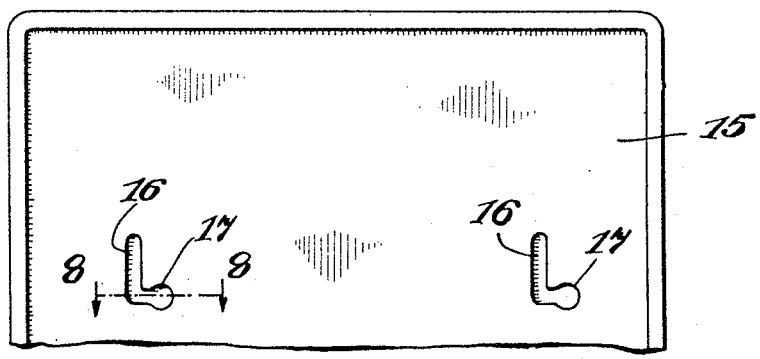
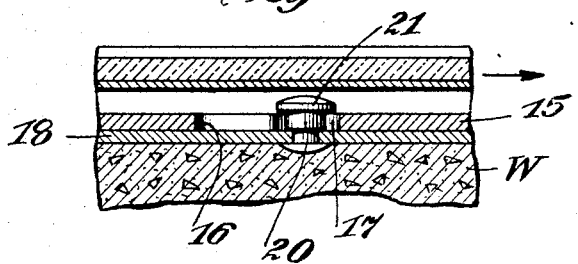
INVENTOR
Samuel Hammer
BY C. P. Goepel
his ATTORNEY Patented Dec. 8, 1931

1,835,042

UNITED STATES PATENT OFFICE

SAMUEL HAMMER, OF BROOKLYN, NEW YORK, ASSIGNOR TO UNITED METAL BOX CO. INC., OF BROOKLYN, NEW YORK, A CORPORATION OF NEW YORK

MIRROR ATTACHING MEANS

Application filed April 26, 1930. Serial No. 447,526.

This invention relates to an improved mirror attaching means, and has for its general object and purpose to provide a simple and efficient device for easily and quickly attaching a framed mirror to supporting means therefor provided on the wall of a cabinet, or suitably secured to the face of a building wall.

It is a more particular object of my invention to provide means for mounting a framed mirror constituting the door of a wall cabinet, after the cabinet itself has been arranged in position and secured within the wall structure and which will operate to effectively prevent any vertical shifting movement of the hingedly mounted door mirror relative to the cabinet structure.

In one practical embodiment of the invention, I provide the mirror frame with suitable leaf hinges, one leaf of each hinge carrying adjustable screws, and one side wall of the box or cabinet structure having vertically spaced flanges projecting from the face of the wall and provided with bayonet slots therein to receive the screws on the hinge leaves. These slots have lower enlarged ends to receive tapering heads on the screws. Thus, even though the screws might become somewhat loosened, the heads of the screws will nevertheless cooperate with the enlarged ends of said bayonet slots to prevent any vertical shifting movement of the cabinet door.

In another embodiment of the invention, I may provide a back plate in the mirror frame having angular slots enlarged at one of their ends adapted to receive headed studs suitably attached to the face of the building wall and by which the mirror will be suspended in close relation to the face of said wall. The studs being entirely concealed, one not familiar with the particular mode of attachment would find considerable difficulty in properly manipulating the mirror to position the studs in line with the enlarged ends of the slots. Thus, the possibility of the removal and theft of the mirror is reduced to a minimum.

With the above and other objects in view, the invention consists in the improved mirror attaching means, and in the form, construction and relative arrangement of its several parts as will be hereinafter more fully described, illustrated in the accompanying drawings, and subsequently incorporated in the subjoined claims.

In the drawings, wherein I have disclosed several simple and practical embodiments of the invention, and in which similar reference characters designate corresponding parts throughout the several views,—

Fig. 5 is a front elevation partly broken away, showing another embodiment of the invention as employed for mounting the mirror on the face of the wall;

Fig. 6 is an enlarged vertical section taken on the line 6—6 of Fig. 5;

Fig. 7 is a detail fragmentary rear elevation of the mirror, and

Fig. 8 is an enlarged horizontal sectional view taken on the line 8—8 of Fig. 7.

Figure 1:
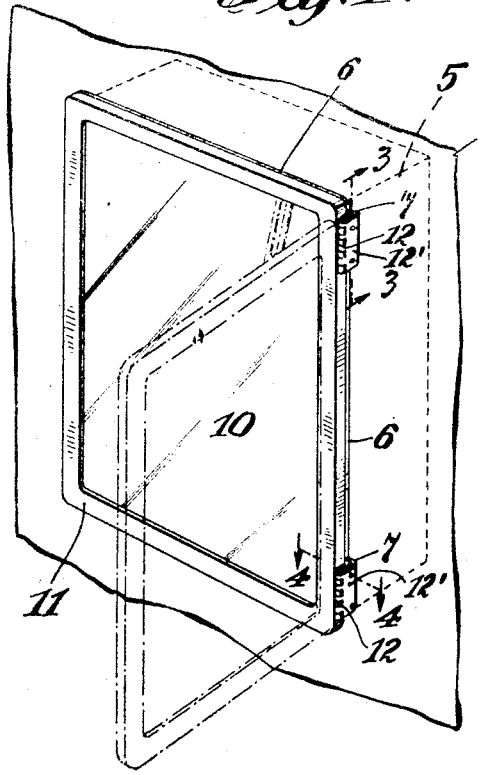
Figure 1 is a perspective view showing one embodiment of my present invention as applied to the hinged door mirror of a bath room cabinet.
Figure 2:
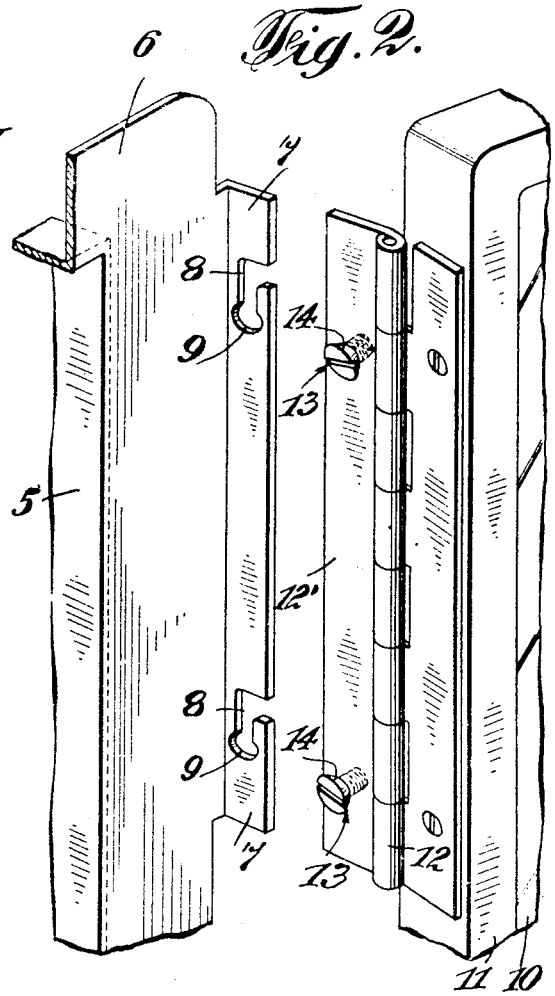
Fig. 2 is an enlarged fragmentary perspective view showing the door mirror in separated relation to the cabinet.
Figure 3:
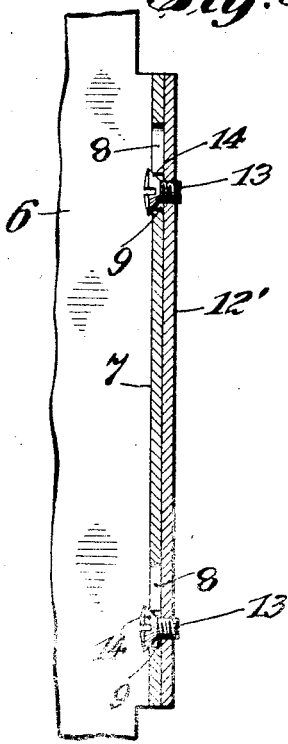
Fig. 3 is an enlarged vertical section taken substantially on the line 3—3 of Fig. 1.
Figure 4:
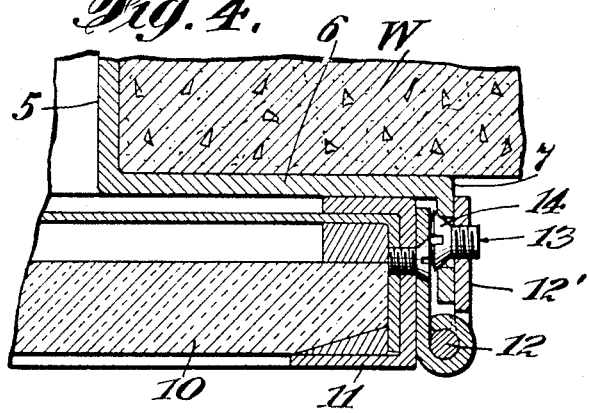
Fig. 4 is an enlarged horizontal sectional view taken on the line 4—4 of Fig. 1.

Referring in detail to the drawings, and for the present more particularly to Figs. 1 to 4 thereof, 5 designates the body structure of a cabinet such as is usually provided in a bath room for receiving toilet accessories, the said cabinet body being suitably mounted and fixed within a mortise or recess provided in the face of the wall structure indicated at W.

At the front open side of the cabinet, the top, bottom and side walls are outwardly flanged as at 6 for engagement with the face of the wall W to conceal the edges of the opening or mortise therein, and at one side of the cabinet, the said flange 6 is provided adjacent its upper and lower ends with the forwardly projecting relatively narrow flanges 7. Each of the flanges 7 adjacent its upper and lower ends is provided with a bayonet slot 8, the upper horizontal end of said slot opening upon the forward edge of the flange, while the vertical part thereof, at its lower end is enlarged as at 9.

The door for the cabinet 5 consists of a mirror 10 suitably mounted in the metal frame 11, the said mirror and frame being of such size that when the door is in closed position, it overlies and completely covers the flanges 6 on the walls of the cabinet 5. To one vertical side of the mirror frame 11 adjacent the upper and lower ends thereof, the leaf hinges 12 of conventional form are attached. One leaf 12' of each of said hinges carries the vertically spaced adjustable screws 13 which have tapering heads 14.

In the installation of such bath room cabinets, it is the present practice, to install the body of the cabinet during the course of construction of the building, the doors of such cabinets being shipped as separate units to be subsequently applied, after the surfaces of the walls have been painted or otherwise finished. By means of the device above described, such subsequent attachment or mounting of the cabinet doors may be easily and quickly effected. Thus, the screws 13 are properly adjusted to position their heads 14 in spaced relation to the hinge leaves 12' so that the shanks of said screws may be readily passed into the upper open ends of the slots 8 in the flanges 7, and then moved downwardly into the lower ends of these slots. The screws 13 are then adjusted and tightened, thus causing their heads 14 to be engaged in the enlarged lower ends 9 of the slots 8. The door mirror is thereby properly mounted for swinging movement with respect to the cabinet so that when in closed position, it will completely conceal the cabinet structure. However, in the event that the screws 13 should become loosend by violent slamming of the door, the heads of said screws will nevertheless remain engaged in the enlarged lower ends 9 of the slots to a sufficient extent to prevent vertical upward movement of the door, in the event that an upward pressure should be accidentally applied against the lower edge of the door frame.

It is to be understood that if desired, the body of the cabinet may be provided with a single flange 7 extending for substantially its entire vertical dimension, while the door is provided with a single continuous hinge instead of the spaced upper and lower hinges as above referred to.

In Figs. 5 to 8 of the drawings, I have illustrated an alternative form of the invention as employed for the purpose of attaching such a framed mirror to the face of a building wall. In this case, the metal backing plate 15 mounted in the mirror frame is provided in spaced relation to its upper end with horizontally spaced L-shaped slots 16. These slots are closed at both ends, and the lower horizontal end portions thereof terminate in the enlargements 17.

To the face of the building wall a metal plate 18 is rigidly attached by means of the screws or other suitable fastening devices shown at 19, and this plate carries two rivets or studs 20 having enlarged heads 21.

In mounting the mirror upon the wall, it is first positioned so as to register the enlarged ends 17 of the slots 16 with the heads 21 of the rivets 20 so that the rivet heads may pass through said ends of the slots as the mirror is pressed towards the wall to engage the back plate 15 thereof with the face of the wall plate 18. The mirror is then shifted laterally so that the shanks of the rivets or studs 20 will be positioned in line with the vertical parts of the slots 16 and is then permitted to fall by gravity until said studs or rivets engage the upper closed ends of said slots. Thus, the mirror is suspended and rigidly held in supported position in close relation to the face of the wall.

Unless one is familiar with the particular means and mode of mounting the mirror in its supported position, it will not be easy to detach and remove said mirror. The latter is quite heavy, and it is necessary to first raise or lift the same vertically until the shanks of the studs or rivets 20 are in the lower ends of the slots 16, and then shift the mirror laterally in the proper direction to align the heads of said studs or rivets with the enlarged ends 17 of the slots, before it is possible to move the mirror outwardly away from the face of the wall and detach the same from the supporting studs. Owing to this difficulty in the detachment or removal of the mirror from its mounted position, liability of theft of the same by rentors of apartments will be reduced to a minimum.

From the foregoing description considered in connection with the accompanying drawings, the construction and several advantages of my present invention will be clearly understood. It will be seen that I have devised a very simply constructed device enabling such framed mirrors to be easily and quickly mounted in applied position, without requiring excessive manual labor. When the first described form of my invention is employed for the purpose of hanging or mounting the mirror doors of bath room cabinets, a proper accurate positioning of the door with relation to the front open side of the cabinet is automatically obtained by the tightening of the attaching screws 13, the said screws being disposed in properly spaced relation to each other, and the slots 8 being also accurately located in the flanges 7 so that subsequent further adjustments will not be necessary. Therefore, as the door mirror may be easily and quickly attached and hung in its applied position, after the body of the cabinet has been installed and the face of the wall completely finished, the door and the mirror are not subject to possible damage or injury. This is an important consideration, since the mirror frames are now being produced in highly ornamental forms of chrominum plated metal, and the face of the mirror glass is more or less easily marred or scratched.

In the accompanying dawings and the foregoing description, I have disclosed several simple and desirable embodiments of my present improvements. It will, however, be understood that the essential features thereof might also be incorporated in various other alternative structural forms, and I accordingly, reserve the privilege of resorting to all such legitimate changes therein as may be fairly embodied within the spirit and scope of the invention as claimed.

I claim:

1. In combination with a wall cabinet and door therefor, means for mounting the door upon said cabinet including flanges on one of the cabinet walls projecting at right angles to the face of the building wall in which the cabinet body is mounted, said flanges being provided with vertically extending slots having their upper ends opening upon the edges of the flanges, leaf hinges secured to one edge of the door, an adjustable member carried by one leaf of each hinge engageable through the open end of one of said slots for movement into the lower closed end of the slot, and said adjustable member having a part adapted upon adjustment of said member to interlock with the wall of said slot to prevent vertical movement of the door relative to the cabinet.

2. In combination with a wall cabinet and door therefor, means for mounting the door upon said cabinet including flanges on one of the cabinet walls projecting at right angles to the face of the building wall in which the cabinet body is mounted, said flanges being provided with vertically extending slots having their upper ends opening upon the edges of the flanges, each of said slots having an enlarged lower end, leaf hinges secured to one edge of the door, vertically spaced adjustable members carried by one leaf of each hinge and engageable through the open ends of the spaced slots in said flange for movement downwardly into the enlarged lower ends of said slots, said members having heads adapted to be engaged in said lower ends of said slots and cooperate with the walls thereof to prevent vertical movement of the door relative to the cabinet.

3. In combination with a cabinet adapted to be mounted in a building wall and having a wall face engaging flange surrounding the open side thereof, said flange at one side of the cabinet being provided with vertically spaced flanges at its outer edge projecting at right angles to the face of the wall, each of the latter flanges having vertically spaced slots therein, said slots extending vertically and opening at their upper ends upon the edge of the flange, the lower ends of said slots being enlarged, a framed mirror constituting a door for said cabinet, leaf hinges secured to the mirror frame, and spaced screws threaded in one leaf of each hinge for engagement through the open ends of the slots in the respective flanges and movable into the lower ends of said slots, said screws having conically formed heads adjustable into binding contact with the walls of the respective slots at their lower ends to rigidly secure the hinge leaves to said flanges and prevent vertical movement of the door relative to the cabinet.

In testimony that I claim the foregoing as my invention, I have signed my name hereto.

SAMUEL HAMMER.